United States Patent [19]

Noda et al.

[11] Patent Number: 4,631,976
[45] Date of Patent: Dec. 30, 1986

[54] STEERING WHEEL

[75] Inventors: Kazushi Noda, Aichi; Hiroshi Mitsunaga, Kadoma, both of Japan

[73] Assignees: Toyoda Gosei Co., Ltd., Nishikasugai; Matsushita Electric Industrial Co., Ltd., Kadoma; Toyota Jidosha K.K., Toyota, all of Japan

[21] Appl. No.: 780,603

[22] Filed: Sep. 26, 1985

[30] Foreign Application Priority Data

Sep. 27, 1984 [JP] Japan .................. 59-202580
Sep. 27, 1984 [JP] Japan .................. 59-202579
Sep. 27, 1984 [JP] Japan .................. 59-202578
Sep. 28, 1984 [JP] Japan .................. 59-205349
Sep. 28, 1984 [JP] Japan .................. 59-205348
Sep. 28, 1984 [JP] Japan .................. 59-205347

[51] Int. Cl.$^4$ .................................. B62D 1/04
[52] U.S. Cl. ............................. 74/552; 219/204
[58] Field of Search ............. 74/552; 219/204, 524, 219/548, 549, 535, 553, 528

[56] References Cited

U.S. PATENT DOCUMENTS

1,429,397 9/1922 Barrow ........................ 219/204
2,662,961 12/1953 Sargent ...................... 219/204
2,812,412 11/1957 Fulham ....................... 219/204
3,627,988 12/1971 Romaniec ................... 219/544
4,535,221 8/1985 Holsworth .................... 74/552
4,547,655 10/1985 Kurata et al. ................ 74/552

Primary Examiner—Larry I. Schwartz
Attorney, Agent, or Firm—Cushman, Darby & Cushman

[57] ABSTRACT

A steering wheel including a ring portion covered with a covering portion, a heat insulating material provided at least at a part on the external circumferential surface of the covering portion at least at the grip of the ring portion, a heating member provided at least at a part of external circumferential surface of the heat insulating material and a surface leather further covering external circumferential surface of said heating member. The heat insulating material is covering the total circumference on the covering portion while a heating member covers only a part of circumferential surface of heat insulating material. And the heat insulating material is made of any one of polymers such as neoprene rubber foam, chloroprene rubber, chloroprene rubber foam, polyethylene foam, polyurethane and polyurethane foam and expanded material of them. The heating member forms a heater made of a heater wire and a pair of sheet members holding the heater wire.

18 Claims, 16 Drawing Figures

STEERING WHEEL

FIELD OF THE INVENTION

The present invention relates to a steering wheel comprising, in the ring portion, a heating material for heating said ring portion.

BACKGROUND OF THE INVENTION

The ring portion of steering wheels of automobiles or motor boats has been improved for enhancing the sense of touch of drivers through elasticity afforded and coverage with leather. However, yet there is no such a steering wheel which has been improved for giving good thermal feeling to driver through temperature adjustment of the grip portion of said ring portion. Therefore the conventional steering wheel has a disadvantage that the steering wheel is cooled to a considerably low temperature by the low external air temperature in case the parking is continued for a long period in the winter season, and a driver receives thermal shock from the cooled ring portion at the initial stage of driving.

Some steering wheels comprising a heating generating material such as a heating wire in the ring portion have therefore been proposed. In such steering wheels, there is a problem that the heat of heating generating material is not transmitted effectively solely to the surface of ring portion, but is transmitted also to the center of ring portion and spoke and thereby a longer period is taken until the surface of ring portion is heated up to the predetermined temperature and application efficiency of heat is correspondingly lowered.

SUMMARY OF THE INVENTION

It is an object of the present invention to provide a steering wheel which gives a warm ring portion even in the initial stage of driving in the winter season having a low external air temperature, does not take a longer period for heating the ring portion up to a predetermined temperature and assures good application efficiency of heat.

It is another object of the present invention to provide a steering wheel which ensures efficient radiation of heat generated the by power control element of the temperature control part of the heating member, does not additionally require provision of a heat sink for heat radiation and comprises a compact temperature control part.

It is further object of the present invention to provide a steering wheel which allows supply of only power source voltage to the temperature control part of the heating member from the steering column of the automobile, but to other thermistors, etc. and assures easy supply of power from the reduced number of contact points.

It is a still further object of the present invention to provide a steering wheel which assures high reliability because the temperaturte of the heater wire is directly detected by a temperature sensing element and shows less dispersion of temperature during temperature control.

It is another object of the present invention to provide a steering wheel wherein a temperature sensing element can detect temperature corresponding to the temperature of the grip portion and is capable of accurately controlling the temperature even in case a temperature sensing element is disposed to an area other than the grip portion.

It is also another object of the present invention to provide a steering wheel wherein a holding pressure is not applied on a temperature sensing element even when a driver holds the grip portion and a temperature sensing element does not easily cause trouble.

It is another object of the present invention to provide a steering wheel wherein it is unlikely that a driver will touch the connecting point of a heater wire and lead wire during operation of the steering wheel and therefore he will not feel an unpleasant feeling, and breaking of said connecting point does not occur easily.

It is also another object of the present invention to provide a steering wheel where any heater in a pair heaters is not heated abnormally and a temperature sensing element and fuse are not comprised within each heater and it is enough that these are comprised within either one of heaters of the pair.

It is another object of the present invention to provide a steering wheel wherein unevenness of the heater wire is absorbed by a sheet member. The heater wire is not in contact with the surface of ring and therefore the sense of touch during operation of steering wheel can be improved.

In view of attaining the aforementioned objects, the steering wheel of the present invention is composed of a ring portion which is covered with a covering, a heat shielding material provided on at least a part of the external circumference of said covering at least at the grip portion of said ring portion, a heating member provided for at least a part of external circumference of said heat insulating material and a surface material further covering the external circumference of said heating member.

Further objects of the present invention will become apparent through understanding of preferred embodiments thereof described hereinafter and also will be clearly defined in the claims. Enforcement of the present invention will let those who skill in this arts recall other various advantages of the invention not described in this specification.

BRIEF DESCRIPTION OF THE DRAWINGS

The drawings attached indicate an embodiment of the steering wheel embodying the present invention, in which.

DETAILED DESCRIPTION OF THE INVENTION

An embodiment of the present invention will be explained with reference to FIG. 1 to FIG. 8.

Figure 1:
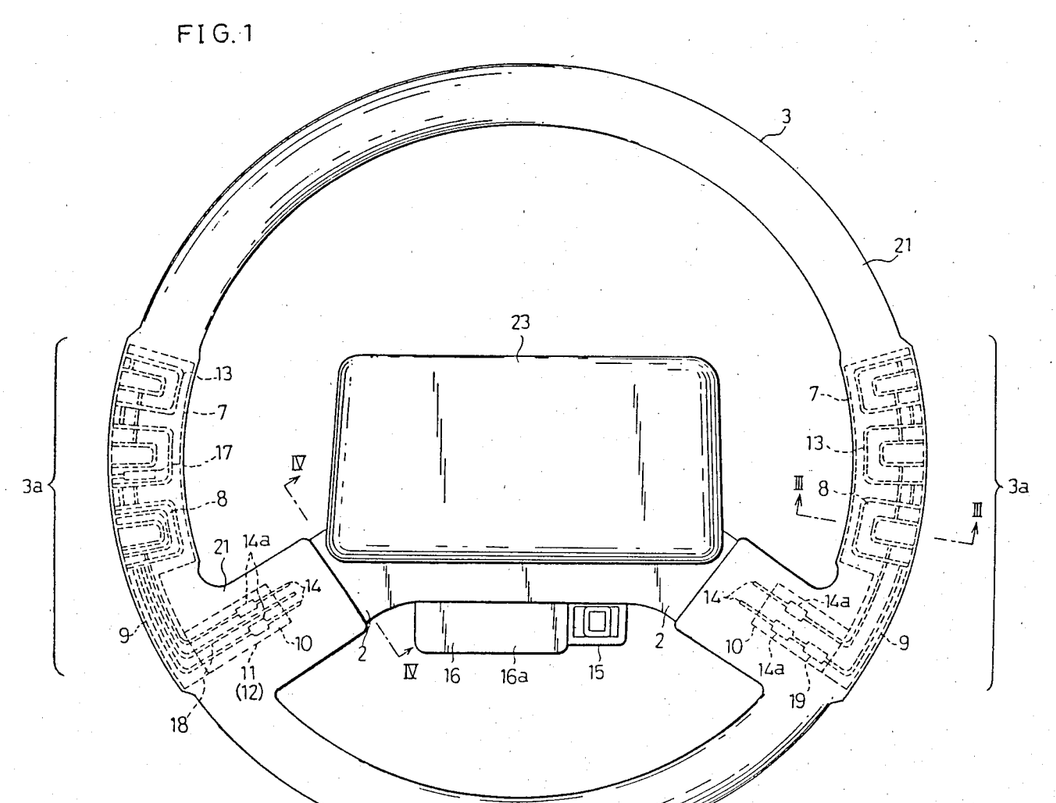
FIG. 1 is a front view of the steering wheel.

A steering wheel is composed of a boss 1 consisting of a metal boss 1a and a boss 1b coupled to the steering shaft not illustrated, a pad 23 attached to the front side of boss 1, a couple of spokes 2 extended downward from the boss 1 and a ring portion 3 supported by the end points of spokes 2.

Figure 3:
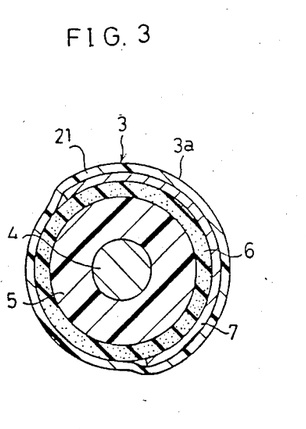
FIG. 3 is an enlarged sectional view along the line III—III in FIG. 1.
Figure 4:
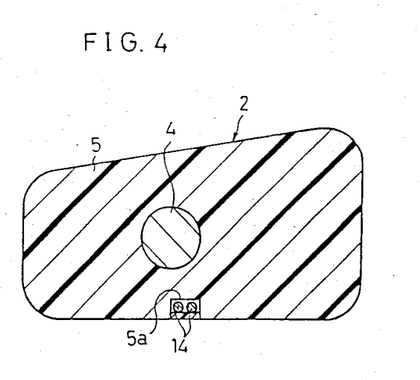
FIG. 4 is an enlarged sectional view along the line IV—IV in FIG. 1.

A core bar 4 made of steel, etc. is disposed at the center of ring portion 3 and this core bar 4 is welded to the boss 1 through the interior of spokes 2. The core bar 4 is surrounded by a covering 5 made of a synthetic resin such as polyurethane. As shown in FIG. 3 and FIG. 4, the coverage 5 has the circular or elliptical outline at the ring portion 3 and the square outline having four rounded corners at the spokes 2 and boss 1.

Regarding the ring portion 3, when the steering wheel is set in the neutral position, the grip portions 3a which are generally held by a driver are usually selected to almost the right and left center parts of ring portion 3, namely to the freely selected portions within the range indicated as 10:10 to 8:20 by the long and short hands of a conventional clock. At both right and left side grips 3a, the external circumference of covered portion 5 is wound with a heat insulating material 6 made of neoprene rubber foam sheet at the entire part of section thereof. This heat insulating material 6 is soft and has a large friction coefficient. Therefore, it is in the close contact with the covering portion 5 without sliding, shielding transmission of heat.

Figure 5A:
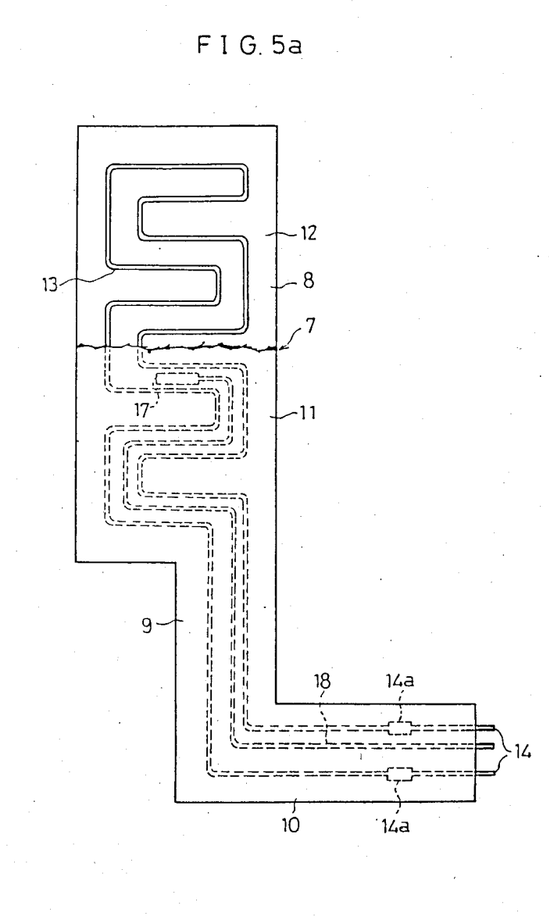
FIG. 5a is a front view of a heater in the left side of the steering wheel.
Figure 5B:
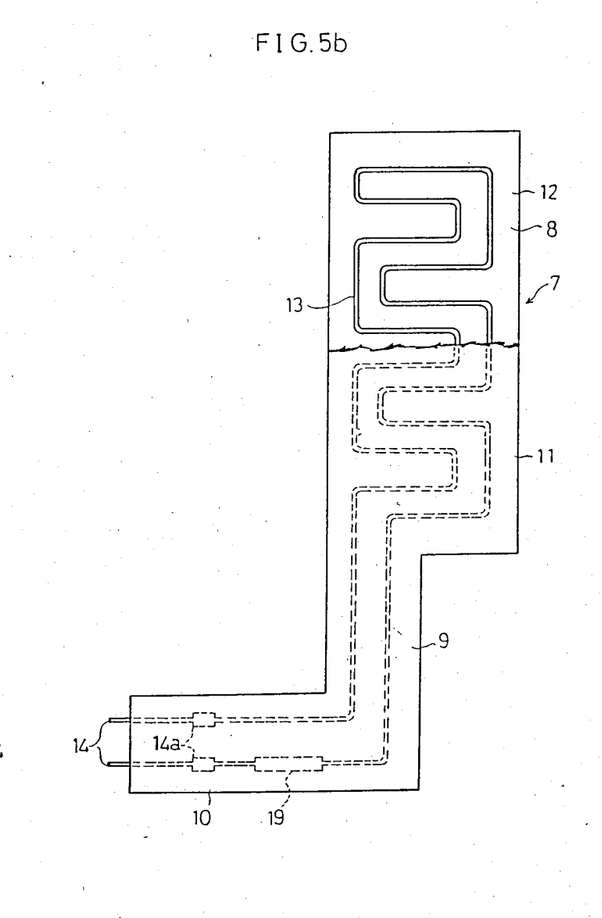
FIG. 5b is a front view of a heater in the right side of the steering wheel.
Figure 6:
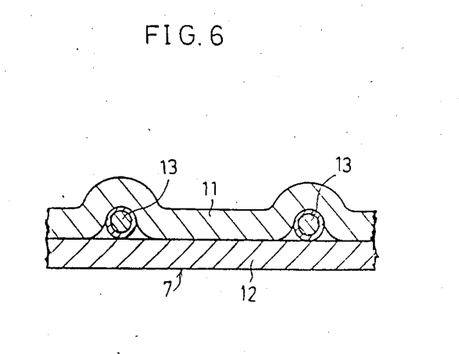
FIG. 6 is a part of enlarged sectional view of the heater.

At the external circumferencial surface of each heat insulating material 6, a heater 7 as the heating member is disposed only to a part (almost the half circumference of external circumference of ring portion 3) along the entire circumference of the section. As shown in FIG. 5a, FIG. 5b and FIG. 6, the major part of such heater 7 is composed of a rectangular heating part 8, an extending part 9 protruded from the lower end of heating part 8, a couple of sheets 11, 12 which have the leadout part 10 extending to the side of extending part 9 and mutually bonded each other and a heater wire 13 which is fixed between both sheets 11 and 12 and is covered with an insulation material at the external circumference. The heating part 8 of the sheets 11 and 12 is disposed in the area extending to the rear part through the external side from the internal side of front part of ring portion 3 at almost the center of grip portions 3a. The extending part 9 is extended downward up to the spoke 2, while the leadout part 10 extends turning to the rear side of spoke 2.

For the sheet 11 of rear side (side of heat insulating material 6), a sufficiently elastic cloth made of twill elastic webbing or knitting of fiber consisting of 100% polyester and subjected to the incombustion processing is used, while for the sheet 12 of front side, the less elastic unwoven cloth obtained from the fiber consisting of 100% polyester and subjected to incombustion processing is used. A heating wire with a synthetic resin insulator is used for the heater wire 13. This heater wire 13 is meandered up and down at the heating part 8 and is then led to the end part of leadout part 10 from the extending part 9.

Therefore, as shown in FIG. 6, the elastic rear sheet 11 is extended unevenly as much as the thickness of heater wire 13 and the front sheet 12 is kept almost flat without unevenness. Therefore, the unevenness is not generated at the surface of ring portion 3. The unevenness of rear sheet 11 is absorbed by the soft heat insulating material 6.

At the leadout part 10, the lead wire 14 is connected to the end part of heater wire 13. Since this connecting point 14a becomes considerably thick, it is protruded from the other part of heater 7. But since the leadout part 10 is disposed at the rear side of spoke 2 as explained above in this embodiment, the driver's hand does not touch on this connecting point 14a during usual operation of the steering wheel.

At the lower part of boss 1, a switch 15 and a small size case 16a accommodating greater part of temperature control part 16 of heater 7 are attached and said lead wire 14 is connected to the switch 15 and temperature control part 16. Both heaters 7 are connected in series. As shown in FIG. 4, the lead wire 14 is built in the recessed path 5a provided at the rear side of covered part 5 of spoke 2. The structure of temperature control part 16 is described later.

At the left side heater 7 to the front side shown in FIG. 5a, a thermistor 17 which is a temperature sensing element is attached to the neighborhood of heater wire 13 provided between the sheets 11 and 12 of heating part 8 and the lead wire 18 of the same thermister 17 is also connected to the temperature control part 16.

In the right side heater 7 to the front side shown in FIG. 5b, a temperature fuse 19 provided for preventing excessive current and overheat is connected in series to the one end part of the heater wire 13. If the heater wire 13 excessively heats the ring part, a temperature fuse 19 blows, making off the current. The temperature fuse 19 is held to the leadout part 10 in such a condition as corresponding to the rear surface of spoke 2.

The outer most circumference of covered part 5, heat insulating material 6 and heater 7 is attached by the surface leather 21 consisting of pure leather or synthetic leather in such an area from the ring portion 3 to the half way point of spoke 2. This surface leather 21 improves the appearance and touch feeling and also fastens the heater 7 at the inside so that it can no longer move.

Figure 8:
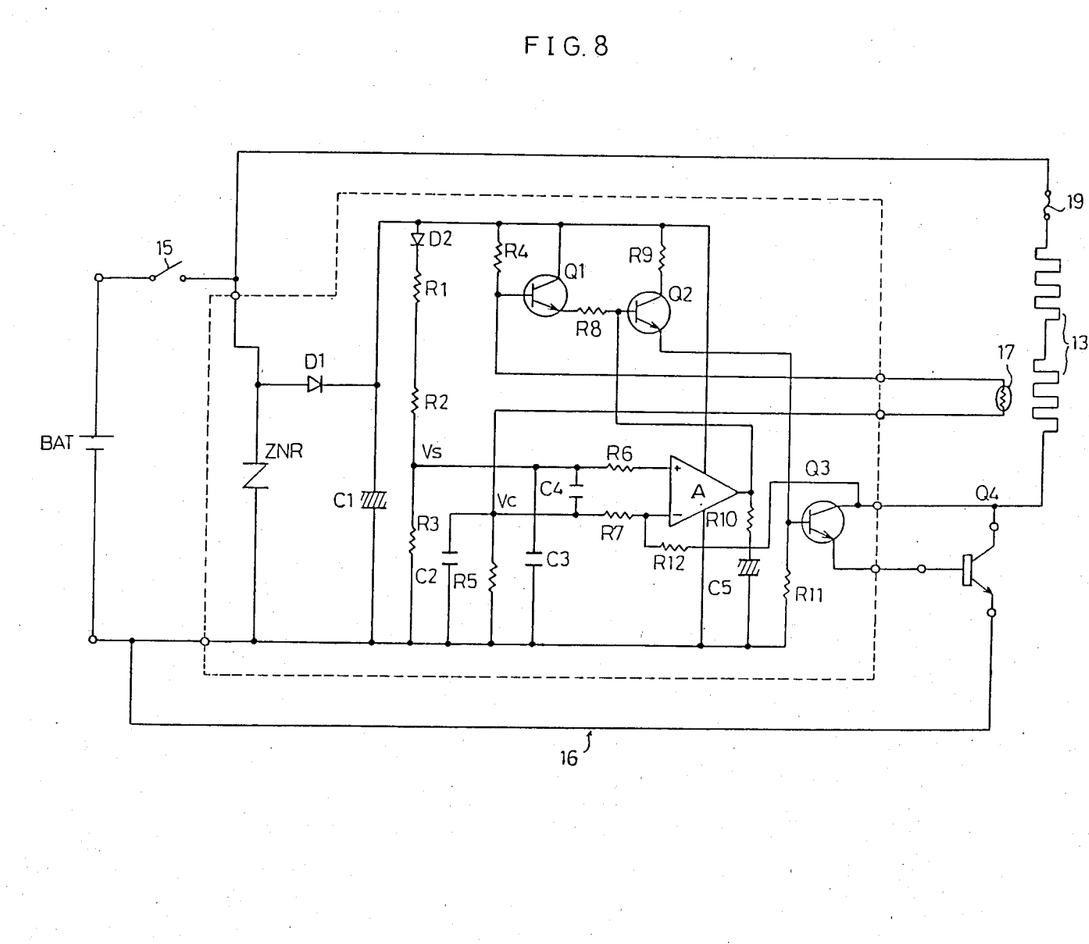
FIG. 8 is a circuit diagram of a temperature control part of the heater.

The circuit structure of temperature control part 16 which controls temperature of heater wire 13 to a constant value will be explained in detail in with respect to FIG. 8. In FIG. 8, the part enclosed by a broken line is accommodated within the case 16a attached to the lower part of boss 1. Therefore, only the power supply line of battery BAT is extended to the temperature control part 16 of steering wheel from the steering column (not illustrated) of automobile.

Figure 2:
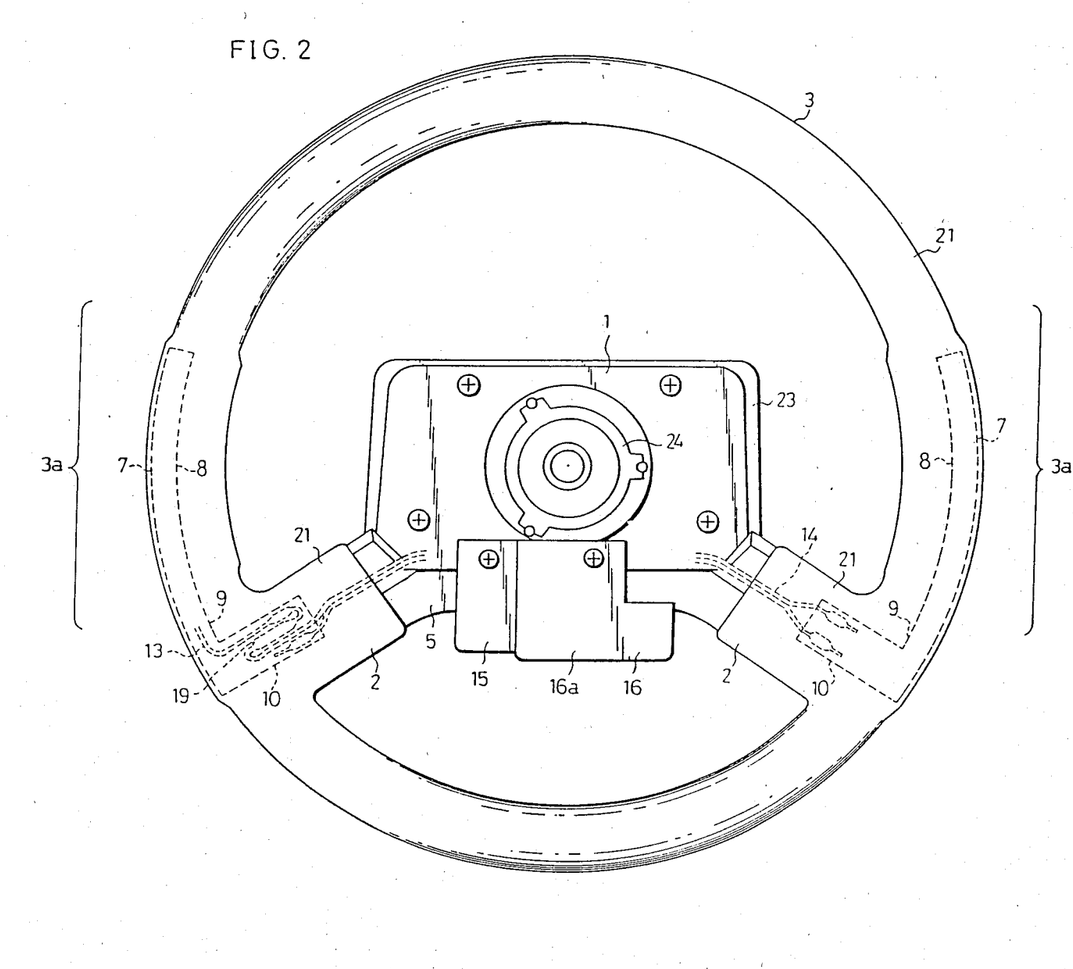
FIG. 2 is a rear view of the steering wheel.

Namely, the positive pole of battery BAT (voltage 12 to 13.5 V) is connected to the temperature control part 16 from the steering column of automobile through the slip ring 24 at the rear side of boss 1 shown in FIG. 2 and the negative pole is also grounded through the steering shaft. The positive pole of battery BAT is connected to a surge current absorbing element ZNR and diode D1 for absorbing dispersions of power supply voltage of the automobile and the power source voltage without small dispersion from the input through the capacitor C1.

The power source voltage is divided by the series resistors R1, R2 and R3 and the reference voltage $V_s$ is generated between the resistors R2 and R3. Moreover, the power source voltage is also divided by the resistor R4, thermistor 17 and resistor R5 connected in series and a control voltage $V_c$ is generated between the thermistor 17 and resistor R5. The reference voltage $V_s$ and the control voltage $V_c$ are respectively input to a comparator A through the resistors R6 and R7. The capacitors C2, C3 and C4 which lower an AC impedance and stabilize the operation are connected to the resistors R5, R6 and R7. Here, the diode D2 equalizes dispersion of reference voltage $V_s$ and control voltage $V_c$ for the dispersion of power source voltage.

A Darlington circuit of transistors Q1 and Q2 is connected to the resistor R4 and an output of the comparator A is connected to the base of transistor Q2 of the second stage. To the base and collector, the resistors R8, R9 for preventing excessive current are connected. Moreover, to the output of comparator A, a series circuit of CR consisting of a resistor R10 and a capacitor C5 is connected and a time constant of it is set to 30 to 60 mS. Therefore, dispersion of output in short period is absorbed and stable control can be realized with a period higher than the predetermined one.

A Darlington circuit of transistors Q3 and Q4 is moreover connected to the emitter resistor R11 of transistor Q2 and a feedback loop for stabilizing operation is connected to the input of control side of comparator A from the collector of transistor Q3 through a resistor R12 having a high resistance value.

Figure 7:
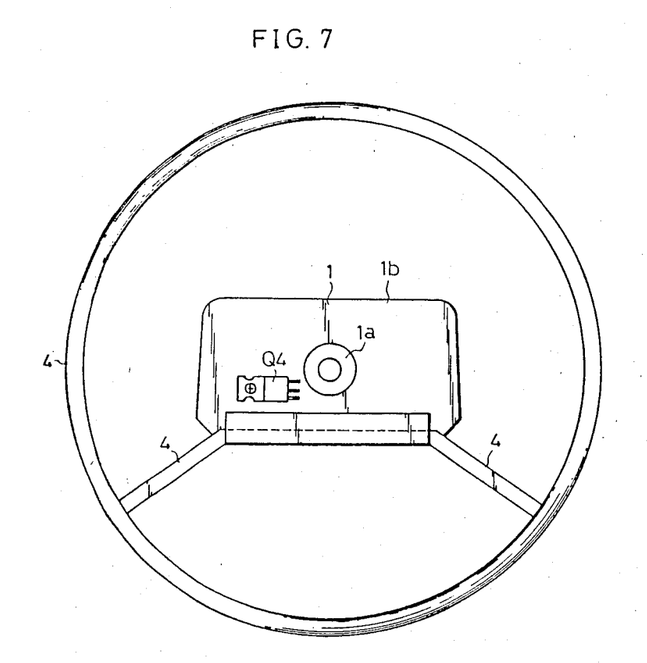
FIG. 7 is a front view showing the core bar and boss of the steering wheel.

As shown in FIG. 7, a power transistor Q4 as a power control element is attached to the boss plate 1b of boss 1 for heat radiation through a mica plate, silicon grease (not illustrated) and said power transistor Q4 and boss plate 1b are thermally coupled but electrically insulated. The boss 1 has a large surface area and ensures sufficient heat radiation because the core bar 4 is thermally coupled by welding.

To the positive pole of battery BAT, the heater wire 13 of said heater 7 is connected in series and to the collector of said transistor Q4, the other end of heater wire 13 is connected.

The control operation of heater 7 in such a case where the steering wheel of the embodiment thus constituted is used at a temperature of 0° C. will be explained hereunder.

When the switch 15 is turned ON, a control voltage $V_c$ becomes lower than the reference voltage $V_s$ because a resistance value of thermistor 17 at a lower temperature and the comparator A in the positive property causes a bias current of transistor Q2 to increase. Therefore, a collector current of transistors Q2 and Q3 increases and thereby the power transistor Q4 as the power control element is driven and a large current flows into the heater wire 13. In this case, the power transistor Q4 generates a considerable amount of heat owing to heat loss but since it is sufficiently radiated by the boss 1 and core bar 4 thermally coupled to the same power transistor Q4, the heat generated is adequately controlled.

After 20 to 30 seconds from turning ON of switch, the heater wire 13 itself reaches about 40° C. in higher point and the surface of ring portion 3 reaches about 30° C. Therefore, the steering wheel can immediately give warm feeling to a driver. Such curtailment of the time required for heating is realized because heat generated from heater 7 is efficiently transmitted to the surface of ring portion 3 owing to the heat insulating effect of heat insulating material 6 provided between the heater 7 and covered area 5 and the heat is little escaped to the covering area 5. Thereby, high appliction efficiency of heat can be assured.

When the heater wire 13 reaches about 55° C. in temperature even in the higher point, a resistance value of thermistor 17 becomes low and therefore the control voltage $V_c$ becomes higher than the reference voltage $V_s$ and the comparator A having negative property cuts the bias current flowing through the transistor Q2. Therefore, the collector current of transistors Q2, Q3, Q4 is almost shielded and a current of the heater wire 13 becomes zero or is minimized.

Temperature of heater 7 is controlled intermittently to a constant value by repeating above operations.

According to this embodiment, since the heat by thermal loss of power transistor Q4 can be radiated sufficiently through the boss 1 and core bar 4, it is no longer necessary to provide a heat sink for heat radiation. Therefore, periphery of the power transistor Q4 used as the power control element can be designed in compact and the temperature control part 16 can be mounted easily to the steering wheel. Moreover, the periphery of power transistor Q4 does not occupy the large area in the pad 23, etc. and thereby dimensions and shape of pad 23 are not restricted and it can be realized easily to provide the switch of other devices such as a constant speed running apparatus or head light in the pad 23.

Since the temperature control part 16 of heater 7 is provided to the boss 1 of steering wheel (in more detail, within the case 16 at the lower part of boss 1 and only the power transistor Q4 is attached to the boss 1), it is not required to extend the power supply to the thermistor but to extend the power supply line of battery BAT between the column of automobile and the temperature control part 16 of steering wheel. Thereby, extension of power supply line can be simplified with less extension points and reliability and cost can be as much improved.

In this embodiment, a heat insulating material 6 and heater 7 are provided only to the right and left grip portions 3a of the ring portion 3 and moreover the heater 7 is disposed only to a part (almost a half circumference of external circumference of ring portion 3) among the total circumference of section at the external circumferencial surface of heat insulating material 6. Therefore, when the steering wheel is set in the neutral position, only the portions where are generally held by a driver are heated. Battery power is not consumed uselessly and the time required for heating can be curtailed.

The materials of sheets 11 and 12 of heater 7 are changed each other and thereby the sheet 11 at the rear side is extended unevenly as much as the thickness of heater wire 13 and the sheet 12 at the front side is kept almost flat without uneveness. Thereby, uneveness does not appear at the surface of ring portion 3 and the touch-feeling is not deteriorated. The heat insulating material 6 results not only in said heat insulating effect but also in the effect of absorbing uneveness of sheet 11 at the rear side because of its flexibility, thereby improving the soft-touch feeling of the ring portion 3.

Furthermore, since the heat insulating material 6 is provided to the total circumference of section at the external circumferential surface of coverted area 5, the stepped portion by the heatinsulating material 6 is not generated and the touch-feeling by hands is also not deteriorated.

Both heaters 7 are connected in series, if any one heater 7 fails, both heaters 7 do not operate. Accordingly, only one heater 7 is no longer heated excessively, and it is enough for only one heater 7 desired to comprise a thermistor 17 or temperature fuse 19 used as the temperature sensing element.

Since a thermistor 17 used as the temperature sensing element is disposed to the part loaded to the grip portion 3a, change of temperature at the grip 3a can be directly detected. Therefore, temperature of grip 3a can be easily controlled to the optimum condition and reliability can also be enhanced because the temperature of heater 7 is directly detected.

Moreover, since a connecting point 14a of heater wire 13 and lead wire 14 is disposed at the rear surface of spoke 2 which is not related to the operation of steering, a driver will not touch on the connecting point 14a of heater wire 13 and lead wire 14 during operation of steering and he does not have uncomfortable feeling and thereby there is a little chance of disconnection of the wires at the connecting point 14a of the heater wire 13 and lead wire 14. In this embodiment, since the temperature fuse 19 used as the overheat or overcurrent preventing element is also disposed at the rear surface of spoke 2, the temperature fuse 19 also does not fail easily.

Figure 9:
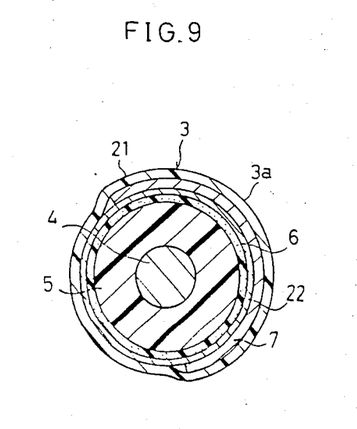
FIG. 9 is an enlarged sectional view of a ring portion of the second embodiment of the present invention.

Here, the second embodiment of the present invention will be explained with respect to FIG. 9. This embodiment is different from said first embodiment only in the point that a heat reflecting layer 22 is provided between the heat insulating material 6 and the heater 7. A thin heat reflecting layer 22 of aluminum obtained by the sputtering is provided at the external surface of heat insulating material 6 in order to reflect the heat radiated from the heater 7 to the heat insulating material 6.

Therefore, this embodiment also shows the similar effect as said first embodiment and is capable of efficiently transmitting the heat generated by heater 7 to the surface of ring portion 3 by effectively preventing the heat to escape to the covering area 5 and thereby further curtails the time required for heating. Power consumption of battery can also be reduced.

Figure 10:
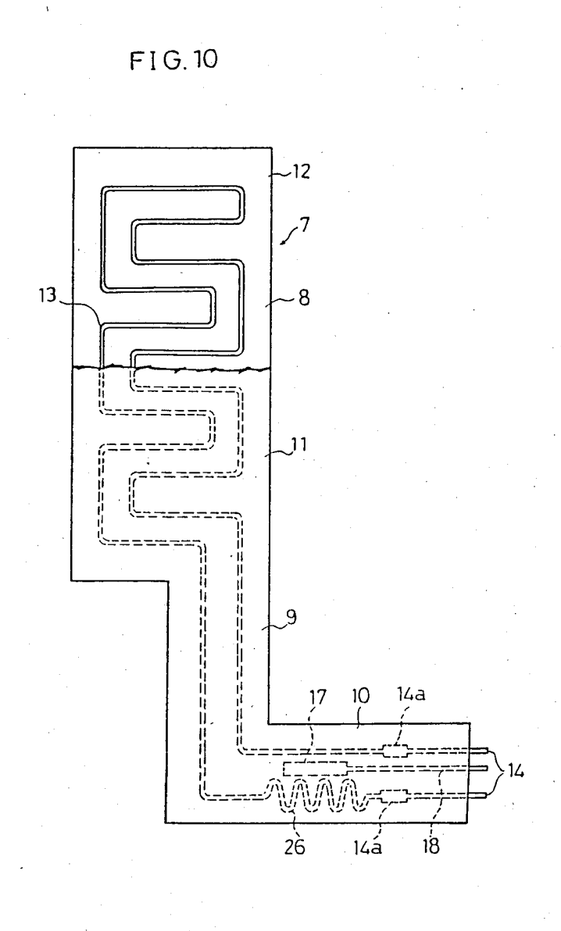
FIG. 10 is a front view of the heater of the third embodiment of the present invention.

The third embodiment of the present invention will be explained with repect to FIG. 10. In this embodiment, structure of heater 7 to be loaded to the steering wheel is different from the first embodiment. Namely, the heater wire 13 is formed as the meander path with a small pitch in the neighborhood of connecting point of the heater wire 13 and lead wire 14 arranged at the leadout part 10 disposed at the rear surface of spoke 2 when it is loaded to the steering wheel. Thereby, an equivalent circuit 26 which changes temperature in conjunction with a part of heater circuit loaded to the grip 3a is arranged. A thermistor 17 used as the temperature sensing element is disposed in the neighborhood of said equivalent circuit 26. The heater 7 thus formed is loaded in the same area in place of the heater 7 loaded to the left side of FIG. 1. Therefore, in the case of this embodiment, reliability of temperature control for setting temperature of the grip 3a to the predetermined temperature as in the case of said embodiment for the thermistor 17 used as the temperature sensing element to detect change of temperature of the equivalent circuit 26 can be enhanced. Moreover, since the thermistor 17 is disposed to the area other than the grip 3a, a driver does not hold the part corresponding to the thermistor 17 on the occasion of operating the steering wheel and thereby a pressing force is not applied on the thermistor 17 and it does not easily cause trouble. In general, the heater 7 in such an area as forming the thermistor 17 is protruded and such protrusion gives unpleasant feeling to a driver during operation of steering wheel. However in this invention, there is no chance of such phenomenon because the thermistor 17 is arranged in an area other than the grip 3a.

The present invention is not limited only to the structures of said embodiments and can also be modified as explained below.

(1) The temperature control part 16 is capable of employing any kind of structure in case a power control element which generates a large amount of heart is used and temperature control of heater 7 is possible. Namely, a power control element includes not only a power transistor but also switching element such as thyristor, etc. For example, a continuous control circuit using a thyristor, etc. can be employed in place of an intermittent control circuit consisting of a comparator A and a power transistor Q4. Moreover, variety of temperature sensing elements such as thermostat, etc. can also be used in place of the thermistor 17.

(2) A loading position of a power control element is not limited to the boss plate 1b of said boss 1 and can thermally be coupled with boss 1a, core bar 4 within the ring portion 3 or spoke 2 or contact plate of electric horn not illustrated. Any position described above has the capability of heat radiation.

Moreover, a coupling method is not limited if it can be thermally coupled.

(3) A loading position of temperature control part 16 other than the power control element is not limited within the case 16a at the lower part of said boss 1 and such position can be selected to the area just before the boss 1, within the pad 23, within the covered area 5 of spoke 2, within the covering area 5 of ring portion 3 or within the core bar 4. Or it can be disposed separately to these areas. Namely, it can be loaded to any position within the steering wheel in case assembling is possible.

(4) Various kinds of structures can be used other than said heater 7 as the heating member. For example, in place of said sheets 11 and 12, a metal film of Al, Fe, Mg having good thermal conductivity, a resin film such as polyethylene, polyester, polyimide or fluoride resin may be used, and as the twill fabric or knitting fabric, the cloth of glass fiber or carbon fiber may also be used.

(5) A material of heat insulating material 6 is not limited to a neoprene rubber foam. Namely, various kinds of polymer materials such as chloroprene rubber, chloroprene rubber foam, polyethylene foam, polyurethane and polyurethane foam or expanded materials of them, inorganic materials such as asbestos and glass wool and other materials having sufficient heat resistivity may be used. Particularly, in case a soft material such as expanded material of polymer material is used, it can absorb ineveness of the sheet 11 at the rear side, resulting in sufficient soft feeling to the ring portion 3.

(6) It is no longer necessary to provide the heat insulating material 6 to the total circumference of section at the external circumferential surface of covering part 5. It is enough when the heat insulating material 6 is provided at least only to the internal side of heater 7. However, it would be better to provide the heat insulating material 6 to the total circumference of section of covering part 5 for improving the touch-feeling as described above.

(7) It is also possible to provide the heat insulating material 6 and heater 7 not only to the grip 3a but also to the entire circumference of ring portion 3. In this case, warm feeling can be obtained even when any points of ring portion 3 are held but a considerable power may be required.

(8) A heat reflection layer 22 is also not limited to the structure of said second embodiment. This reflection layer 22 can be formed by various methods; for example, sputtering, vacuum deposition, attachement or sole winding of metal foil to the external circumferencial surface of heat insulating material 6. The metal used is also not limited to aluminum.

(9) As the temperature control part 16, any kind of structure, if it can control temperature of heater 7 and requires only extension of power supply line of battery BAT from the column of automobile, can be used. For example, a relay may be used in place of the power transistor Q4 for power control of said embodiment.

Figure 11:
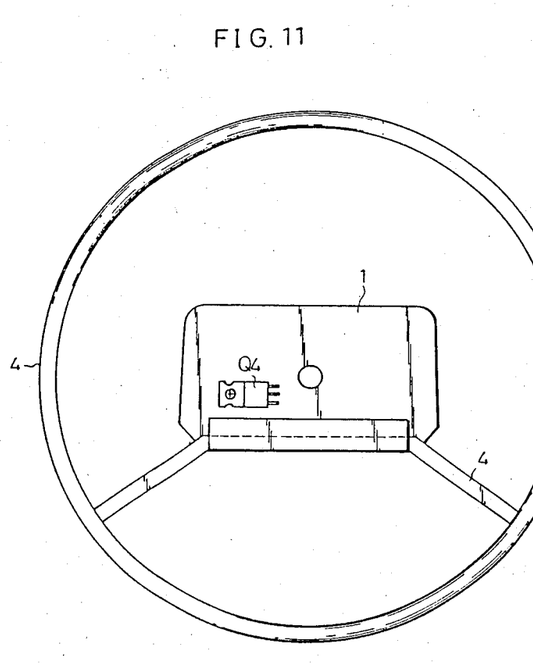
FIG. 11 is a front view showing the core bar and boss.

(10) As shown in FIG. 11, the power transistor Q4 for power control may be loaded through a mica plate to the boss 1 for the heat radiation under the condition that it is electrically insulated.

Figure 12:
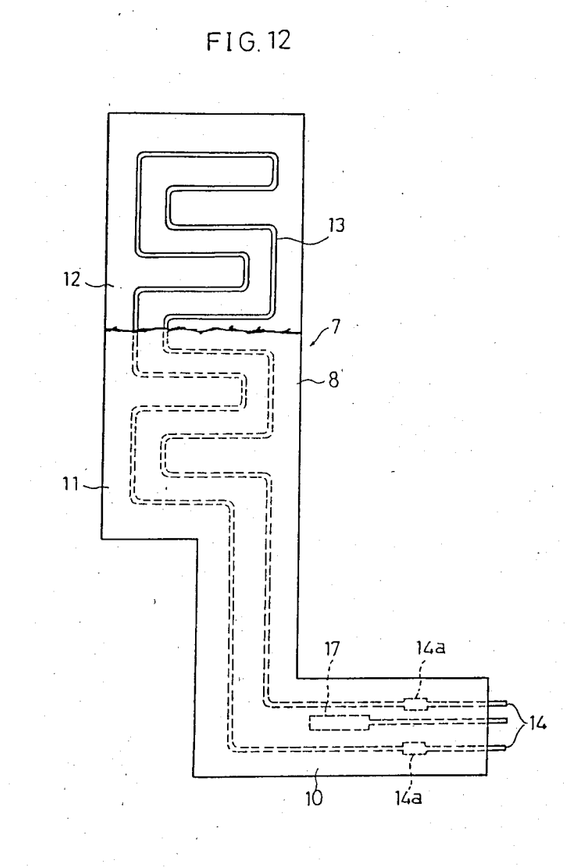
FIG. 12 to FIG. 15 are front views indicating other examples of the heater.

(11) As shown in FIG. 12, a thermistor 17 used as the temperature sensing element may be fixed between both sheets 11 and 12 at the leadout part 10 of heater 7 corresponding to the rear surface of spoke 2.

Figure 13:
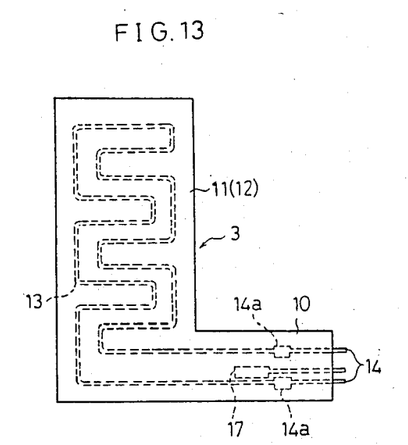
Figure 14:
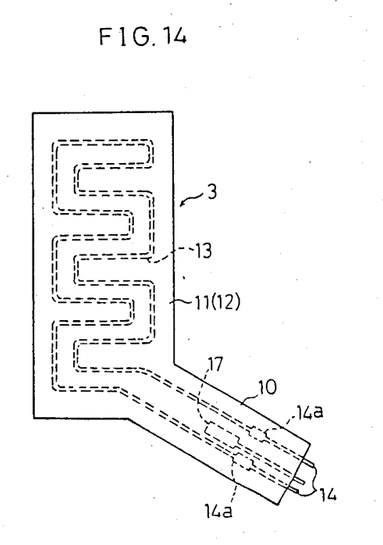
Figure 15:
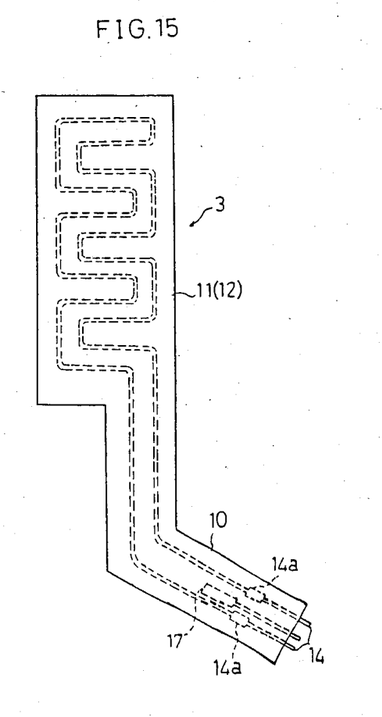

(12) The shape of heater 7 as the heating member or leadout part may be changed as desired in accordance with the shape and angle of spoke 2, for example, rectangular shape of heater may be changed to ellipse and the shape of leadout portions 10 can be changed as shown in FIG. 13 to FIG. 15.

Since it is apparent that change or modification of embodiment of the present invention can be formed without departure from the spirit and scope of the present invention, the present invention is not restricted to the particular embodiments, except for the restriction by the claims thereof.

Although the term "circumferentially" has been used in this specification both to indicate extent in the direction about the whole of the steering ring, i.e. "longitudinally" of the main axis of the cylinder whose ends are coincided to create the toroidal form, and to indicate extent in a direction about a respective transverse section of the steering ring, i.e. circumferentially of the outer periphery of such a section and at right angles to the first-mentioned circumferential direction, to avoid confusion in the claims, the term "circumferential" is used therein to denote extent in the first-mentioned direction, and the term "peripheral" is used to denote extent in the second-mentioned direction.

What is claimed is:

1. An electrically-heated steering wheel, comprising:
a central boss, a steering ring located radially outwardly of said boss, and at least one spoke joining said boss with said steering ring, said steering wheel, and therefore said at least one spoke, having a front side adapted to face a vehicle driver and a rear side adapted to face away from the vehicle driver, said steering ring including a core bar having a covering, said steering ring having at least one grip portion adapted to be gripped by a respective hand of a driver especially while the steering wheel is in a null position corresponding to straight-ahead travel, each said grip portion being located adjacent to a respective said spoke about the circumference of said steering ring;

a layer of heat insulating material provided on said covering of said steering wheel so as to cover said at least one grip portion of said steering ring in the circumferential direction of said steering ring, throughout at least a radially outer portion of said steering ring;

at least one heating member comprising two superimposed generally L-shaped sheets of combustion-resistant material having a heater wire sandwiched between them so that a heating portion of said heater wire extends between corresponding one legs of said sheets, and leads for said heating portion extend from said heating portion between corresponding other legs of said sheets and terminate in means defining a connector for said heater wire;

a temperature sensor associated with at least one said heating member and having a lead juxtaposed with said lead for said heating portion of said heating member;

said heating member and said temperature sensor being disposed on said layer of heat insulating material on a respective said at least one grip portion so that said one legs of said sheets extend in the circumferential direction of said steering ring and so that said other legs of said sheets extent radially inwardly of said steering wheel along the side of a respective said at least one spoke;

a cover layer covering said at least one heating member, this cover layer extending sufficiently completely peripherally of said steering ring as to hold the respective said heating member in place; and an electrical circuit adapted to obtain electrical power from an automotive electrical system and provide such electrical power to each said heater wire, this electrical circuit including a connector for connecting with the respective said connector of each said heater wire on the rear side of a respective said spoke and a temperature control constructed and arranged to receive indications of temperature from said temperature sensor and for providing electrical power to said heater wire in dependence upon such indications of temperature.

2. The electrically-heated steering wheel of claim 1, wherein:
said layer of heat insulating material is one selected from the group consisting of neoprene, chloroprene, polyethylene and polyurethane.

3. The electrically-heated steering wheel of claim 2, wherein:
said layer of heat insulating material expanded.

4. The electrically-heated steering wheel of claim 1, wherein:
said two sheets of said heating member include an inner sheet covered by an outer sheet, said inner sheet being more elastic than said outer sheet.

5. The electrically-heated steering wheel of claim 4, wherein:
said inner sheet is made of twill fabric and said outer sheet is made of non-woven fabric.

6. The electrically-heated steering wheel of claim 5, wherein:
both said sheets are made of all-polyester fiber which has been treated to render it non-combustible.

7. The electrically-heated steering wheel of claim 4, wherein:
said inner sheet is made of knit fabric and said outer sheet is made of non-woven fabric.

8. The electrically-heated steering wheel of claim 7, wherein:
both said sheets are made of all-polyester fiber which has been treated to render it non-combustible.

9. The electrically-heated steering wheel of claim 1, wherein:
at least one of said two sheets of said heating member is a film made of a metal selected from the group consisting of aluminum, steel and magnesium.

10. The electrically-heated steering wheel of claim 1, wherein:
at least one of said two sheets of said heating member is a film of a synthetic plastic resin selected from the group consisting of polyethylene, polyester, polyimide and fluorocarbon.

11. The electrically-heated steering wheel of claim 1, wherein:
at least one of said two sheets of said heating member is a woven fiber cloth made of fibers selected from the group consisting of carbon and glass.

12. The electrically-heated steering wheel of claim 1, further including:
a second said grip portion provided on said steering ring approximately diametrically opposite a first said grip portion;
said layer of heat insulating material covering both said first and second grip portions;
a first and a second said heating member provided, each associated with a respective one of said first and second grip portions;
said cover layer covering both said first and said second heating member;
said electrical circuit connecting said heating wire of said first heating member in series with said heating wire of said second heating member.

13. The electrically-heated steering wheel of claim 1, further including:
a heat-reflecting layer sandwiched between said layer of heat insulating material and said heating member.

14. The electrically-heated steering wheel of claim 13, wherein:
said heat-reflecting layer is a thin metal film formed externally on said layer of heat insulating material.

15. The electrically-heat steering wheel of claim 1, wherein:
said heating portion of said heating wire is disposed in a meander path.

16. The electrically-heated steering wheel of claim 15, wherein:
a portion of one of said leads of said heating wire is disposed in a meander path constituting an equivalent circuit and said temperature sensor is juxtaposed with said equivalent circuit.

17. The electrically-heated steering wheel of claim 1, wherein:
said cover layer is made of real leather.

18. The electrically-heated steering wheel of claim 1, wherein:
said cover layer is made of synthetic leather.

* * * * *